(12) United States Patent
Luke

(10) Patent No.: US 6,735,898 B2
(45) Date of Patent: May 18, 2004

(54) ARTIFICIAL FISHING LURE

(76) Inventor: Mike Luke, 1509 Osceola Ave., Jacksonville Beach, FL (US) 32086

( * ) Notice: Subject to any disclaimer, the term of this patent is extended or adjusted under 35 U.S.C. 154(b) by 0 days.

(21) Appl. No.: 10/131,269

(22) Filed: Apr. 22, 2002

(65) Prior Publication Data

US 2003/0196369 A1 Oct. 23, 2003

(51) Int. Cl.$^7$ ................................................ A01K 85/16
(52) U.S. Cl. ..................................... 43/42.28; 43/42.48
(58) Field of Search ........................... 43/42.48, 42.36, 43/42.28, 42.21; D22/133

(56) References Cited

U.S. PATENT DOCUMENTS

| | | | | |
|---|---|---|---|---|
| 1,700,061 A | * | 1/1929 | Kimmich | 43/42.28 |
| 1,754,567 A | | 2/1930 | Newell | |
| 1,874,102 A | * | 8/1932 | Jacobs | 43/42.13 |
| 1,884,053 A | * | 10/1932 | McGarraugh | 43/42.28 |
| 2,028,050 A | * | 1/1936 | De Witt | 43/42.06 |
| 2,107,436 A | * | 2/1938 | Flanagan | 43/42.13 |
| 2,201,082 A | * | 5/1940 | Dobbins et al. | 43/43.13 |
| D121,492 S | * | 7/1940 | Lucksted | D22/126 |
| 2,481,789 A | * | 9/1949 | Smith | 43/42.15 |
| D160,802 S | * | 11/1950 | Marshall et al. | D22/133 |
| 2,617,226 A | | 11/1952 | Yoshii | |
| 2,742,729 A | * | 4/1956 | McVay | 43/42.48 |
| 2,829,462 A | | 4/1958 | Stokes | |
| 2,861,380 A | * | 11/1958 | Peterson | 43/42.22 |
| 2,912,783 A | | 11/1959 | Marks | |
| 2,938,293 A | * | 5/1960 | Richardson | 43/42.24 |
| 3,914,895 A | | 10/1975 | Mize | |
| 4,223,469 A | | 9/1980 | Luz | |
| 4,477,994 A | * | 10/1984 | Erickson | 43/42.44 |
| 4,619,067 A | | 10/1986 | West | |
| 4,736,542 A | | 4/1988 | Floyd | |
| 5,155,948 A | | 10/1992 | Kitagwa | |
| 5,167,089 A | | 12/1992 | Schriefer | |
| 5,261,181 A | * | 11/1993 | Melton | 43/42.06 |
| 5,533,296 A | | 7/1996 | Jansen | |
| 5,596,831 A | | 1/1997 | McWethy, Jr. | |

* cited by examiner

*Primary Examiner*—Michael J. Carone
*Assistant Examiner*—James S. Bergin
(74) *Attorney, Agent, or Firm*—Thomas C. Saitta

(57) ABSTRACT

An artificial fishing lure having a squid-like appearance with a generally cylindrical body and a skirt with a plurality of thin, elongated, flexible streamers, wherein the nose of the body is formed by the combination of a rearwardly inclined planar surface intersecting with a rounded surface, wherein the central axis of the lure body extends through the planar surface.

15 Claims, 1 Drawing Sheet

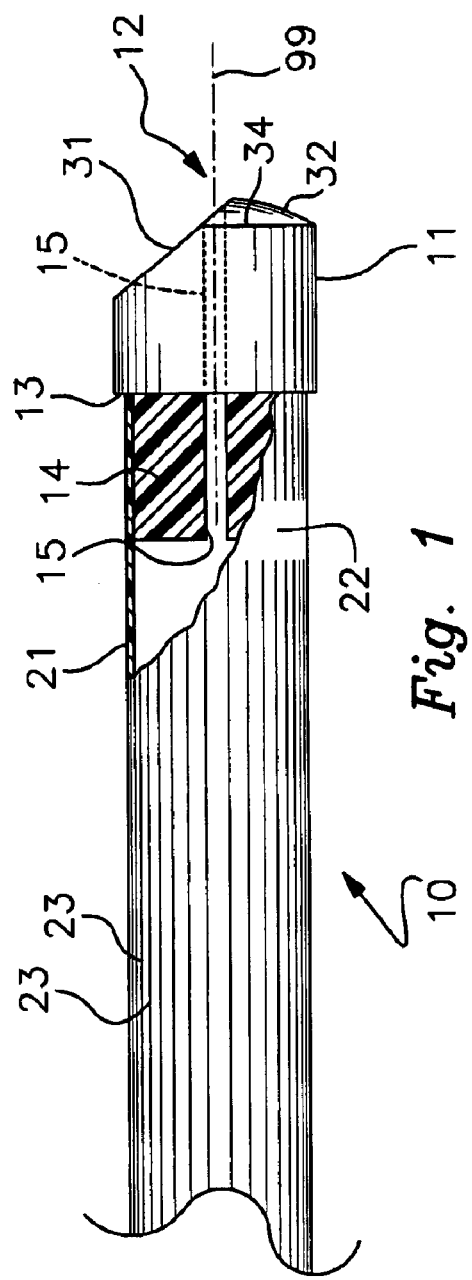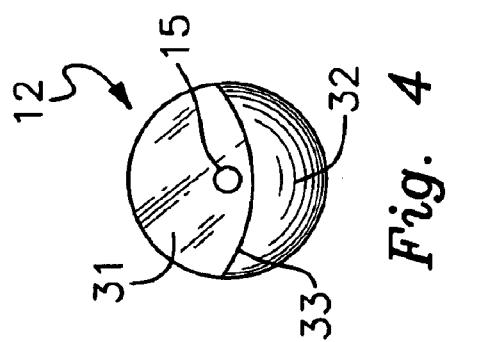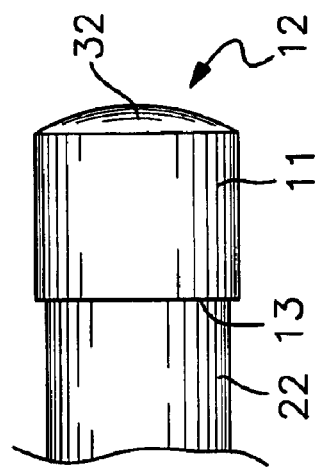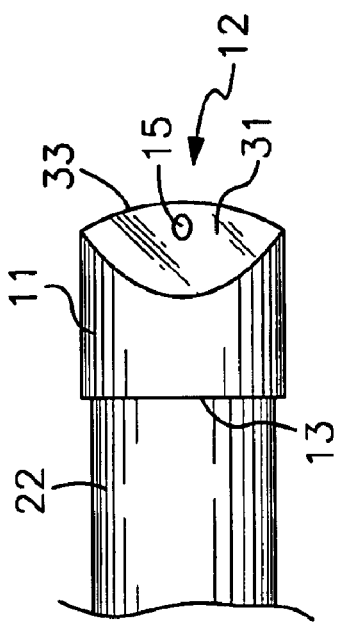

ARTIFICIAL FISHING LURE

BACKGROUND OF THE INVENTION

This invention relates generally to the field of artificial fishing lures, and more particularly relates to such lures which are constructed to simulate live prey upon which the fish feed, with the lure simulating the prey both visually in shape and configuration and in movement as the lure is pulled through the water. Even more particularly, this invention relates to such lures which are designed to simulate a squid, such that the body is generally cylindrically shaped and a large number of simulated tentacles trail from the body.

A number of fish which are sought for sport or for eating are natural predators of squid, such as for example the kingfish. It is therefore well known to fashion artificial fishing lures with the shape of a squid. Such lures are constructed with a generally cylindrical- or torpedo-shaped body. The line is attached to or through the nose or front end of the body, and a relatively large number of thin, elongated, flexible members, often called a skirt, are attached to the rear of the body to simulate the tentacles of a squid. Such lures and variations thereof may be used for many types of fish, whether such fish naturally include squid in their diet, and whether the fish are inhabitants of salt or fresh water, since the visual appeal of the slim body and undulating skirt members of the lure in itself may be sufficient to attract fish strikes.

Examples of similar lures, some illustrating bodies only with no trailing tentacles or skirt members, are found in numerous U.S. patents, such as U.S. Pat. No. 1,754,567 issued in 1930 to Newell, U.S. Pat. No. 5,167,089 issued in 1992 to Schriefer, U.S. Pat. No. 4,736,542 issued in 1988 to Floyd, U.S. Pat. No. 5,596,831 issued in 1997 to McWethy, Jr., U.S. Pat. No. 2,617,226 issued in 1952 to Yoshii, U.S. Pat. No. 4,619,067 issued in 1986 to West, U.S. Pat. No. 5,155,948 issued in 1992 to Kitagawa, U.S. Pat. No. 5,533,296 issued in 1996 to Jansen, U.S. Pat. No. 2,829,462 issued in 1958 to Stokes, U.S. Pat. No. 4,223,469 issued in 1980 to Luz, U.S. Pat. No. 3,914,895 issued in 1975 to Mize, and U.S. Pat. No. 2,912,783 issued in 1959 to Marks. These lures vary in the configuration of the nose or front end of the cylindrical body. The lures of Newell and Schriefer have symmetrical, elliptical noses, i.e., the noses are bullet-shaped. The lures of Floyd and McWethy, Jr., have perpendicular, fully planar noses. The lures of McWethy, Jr., Yoshii, West and Kitagawa have angled, fully planar noses. The Jansen lure has an angled, fully planar nose with a notch. The lures of Stokes and Luz have noses with two non-parallel, planar surfaces, and the lure of Mize has a fully concave and angled nose. The Marks lure has a bi-laterally symmetrical, concave nose divided along a vertical midline, where a small portion at the top of each of the lateral shoulders is rounded to the rear, as shown best in the cross-sectional view of FIG. 2, where the most forward portion of the head 14, identified before as a lateral shoulder, is shown as exposed rather than a cross-section.

The reason for the variation in the configuration of the noses of these lures is to produce an artificial lure which either travels more cleanly through the water, sheds seaweed or other plant matter more easily if the lure is pulled through such, causes the lure to dive, dart or move in a desired non-linear manner when pulled through the water, or produces combinations of some or all of the above. While the designs of the noses in the known patents produce such effects to one degree or another, the known lures do not possess a nose shape which optimizes the desired properties. In particular, the known lures do not perform optimally in an offshore environment, where swells and waves are often encountered during the fishing operation. It is therefore an object of this invention to provide an artificial fishing lure shaped to simulate a squid, such that it possesses a cylindrically shaped body and a trailing skirt of flexible elongated streamers, wherein the configuration of the nose or front end of the body of the lure is such that the lure will dart erratically when drawn either along the surface through waves or beneath the surface, yet will not dive below a desired depth and which will readily shed any seaweed which is encountered. These objects, plus other objects not expressly stated, will be apparent upon examination of the disclosure to follow.

SUMMARY OF THE INVENTION

The invention is in general an artificial fishing lure having a generally squid-like configuration with a generally cylindrical or torpedo-shaped body and a trailing skirt of elongated, flexible streamer members. The forward end of the body is defined as the nose and is provided with a particular configuration to cause the lure to behave in a desired fashion as the lure is pulled through the water. The body comprises the nose, an annular shoulder located approximately midway along the body longitudinally, a cylindrical skirt plug to receive the skirt collar, and a small diameter coaxial bore for attachment of the line or leader. The skirt is preferably formed of a flexible plastic material and comprises an annular collar for attachment to the skirt plug of the main body and a relatively large number of thin, elongated streamer members which extend rearward from the skirt collar.

The nose of the body is comprised of two major surfaces—a planar face disposed at an angle of approximately 45 degrees relative to the longitudinal axis of the body and a convex or rounded portion. The planar surface meets the rounded surface along a curved line which does not intersect the axial bore, such that the forward opening of the axial bore is fully disposed in the planar surface. The rounded surface is most preferably formed as a portion of a sphere and extends rearward only a short distance. The planar surface extends rearward a greater distance than the rounded surface.

BRIEF DESCRIPTIONS OF THE DRAWINGS

FIG. 1 is a side or lateral view of the invention, with the streamer members truncated and a portion of the skirt removed to expose the skirt plug, which is shown in axial cross-section.

FIG. 2 is a partial top view of the invention showing the planar surface of the nose.

FIG. 3 is a partial bottom view of the invention showing the rounded surface of the nose.

FIG. 4 is a front view of the invention, showing both the planar and the rounded surfaces of the nose.

DETAILED DESCRIPTION OF THE INVENTION

With reference to the drawings, the invention will now be described in detail with regard for the best mode and the preferred embodiment. In a most general sense, the invention is an artificial fishing lure having a generally cylindrical body and a skirt member with plural elongated streamer members, such that the overall shape and configuration of the lure is similar in appearance to that of a small squid. The feature of primary importance is the configuration of the nose or forward end of the lure, as the nose configuration as described and claimed below is a novel improvement over the shape and configuration of other lures in terms of the behavior of the lure during use.

The lure 10 comprises in general a body member 11 and a skirt member 21. The body 11 is preferably formed of an acrylic or similar plastic material so as to be relatively durable and rigid. The skirt 21 is preferably formed of a more compressible, flexible plastic material. Either the body 11 or the skirt 21 could be manufactured of non-plastic materials having similar properties and suitable for use in marine environments. The body 11 is generally cylindrical in shape, such that a longitudinal central axis 99 is defined. The forward portion of the body 11, that being the portion which is drawn first through the water when in use, defines a nose portion 12. The outer diameter of the body 11 is reduced approximately midway or further to the rear to define an annular shoulder 13 having a rear wall generally perpendicular to the axis 99 and a cylindrical skirt plug 14. Preferably the reduction in diameter is such that diameter of the shoulder 13 and the exposed portion of the body 11 forward of the shoulder 13 is of greater diameter than the outer diameter of the skirt collar 22 when it is attached to the skirt plug 14. This configuration results in the shoulder 13 creating vortexes and bubbles as the lure 10 is drawn through the water. A coaxial bore 15 of relatively small diameter extends longitudinally through the body 11. The coaxial bore 15 receives a line, leader or other connector means for attachment of the lure 10 in known secure manner.

The skirt 21 is preferably a tubular member, or it may be formed from a sheet-like member which is wrapped to form a tube, and comprises an annular skirt collar 22 and elongated, thin streamer members 23 which extend rearward from the collar 22. The collar 22 is attached to the skirt plug 14 using adhesive or other suitable fastening means, such that the skirt plug 14 is encircled by the skirt collar 22. The rear portion of the skirt 21 is provided with a relatively large number of axially oriented slits to create a plurality of elongated, thin streamer members 23 having free ends such that the streamers 23 will bend and undulate when drawn through the water.

The forward end or nose 12 of the lure body 11 comprises a planar surface 31 and a convexly rounded surface 32, with planar surface 31 and rounded surface 32 intersecting along a curved junction 33. The planar surface 31 is sloped rearward relative to the central axis 99 at approximately 45 degrees and extends beyond the central axis 99 such that the central axis 99 passes through the planar surface 31, and such that the planar surface 31 extends a short distance beyond and encompasses the forward opening for the coaxial bore 15. The rounded surface 32 is most preferably a section of sphere and intersects the cylindrical portion of the body 11 along a partially circular junction 34 which occupies a plane perpendicular to the central axis 99 and which is truncated by the planar surface 31.

Preferred approximate dimensions for the lure 10, which are also preferred approximate ratios, consist of a body 11 which is 1 and ¾ inches in overall length, with the shoulder 13 disposed one inch from the front of the nose 12 such that a skirt plug 14 with a length of ¾ inches is defined. The body 11 is preferably one inch in diameter and the skirt plug 14 is preferably 13/16 inches in diameter. The partially circular junction 34 is preferably disposed ⅛ inches from the front of the nose 12 and thus ⅞ inches in front of the shoulder 13.

The planar surface 31 truncates the body 11 to a distance of preferably ½ inches at its shortest longitudinal dimension. On a line containing the central axis 99 and the midpoint of the curved junction 33 separating the rounded surface 32 from the planar surface 31, the midpoint is preferably ⅛ inches from the central axis 99. The coaxial bore 15 is preferably ⅛ inches in diameter. The skirt 21 is preferably eight inches in length.

The configuration for the nose 12 as described causes the lure 10 to dart erratically when it hits the water surface and then drawn through the water, whether the lure 10 is pulled along the surface through waves or at a desired distance below the surface. The combination of the planar surface 31 and the rounded surface 32 prevents the lure 10 from diving to undesirable depths. The rounded surface 32 also acts to shed weeds from the lure 10. In use the rounded surface 32 is the lowermost portion of the nose 12.

It is understood that equivalents or substitutions for certain elements set forth illustratively above may be obvious to those skilled in the art. The true scope and definition of the invention therefore is to be as set forth in the following claims.

I claim:

1. In an artificial fishing lure comprising a generally cylindrical body with a longitudinal central axis, a nose on the front of said body, and an attached skirt comprising a plurality of streamer members, the improvement wherein said nose comprises the combination of a planar surface and a convex rounded surface, wherein said planar surface intersects with said body at an oblique angle to said longitudinal central axis, said planar surface and said rounded surface intersect along a curved junction and said rounded surface intersects said body along a partially circular junction which occupies a plane perpendicular to said longitudinal central axis, and wherein the outer boundary of said planar surface is defined by the intersection of said planar surface with said body and said rounded surface, and wherein no portion of said rounded surface extends radially beyond said partially circular junction in the direction perpendicular to said longitudinal central axis.

2. The lure of claim 1, wherein said planar surface is sloped rearward from said central axis at an angle of approximately 45 degrees.

3. The lure of claim 1, wherein said central axis extends through said planar surface.

4. The lure of claim 1, wherein said rounded surface is a portion of a sphere.

5. An artificial fishing lure comprising:
   a generally cylindrical main body comprising a nose, a skirt plug, and a coaxial bore disposed about a longitudinal central axis;
   a skirt comprising a collar attached to said skirt plug and a plurality of elongated, flexible streamer members;
   wherein said nose comprises a planar surface and a convex rounded surface, said planar surface intersects with said body at an oblique angle to said longitudinal central axis, said planar surface and said rounded surface intersect along a curved junction, and said rounded surface intersects said body along a partially circular junction which occupies a plane perpendicular to said longitudinal central axis,
   and wherein the outer boundary of said planar surface is defined by the intersection of said planar surface with said body and said rounded surface, and wherein no portion of said rounded surface extends radially beyond said partially circular junction in the direction perpendicular to said longitudinal central axis.

6. The lure of claim 5, wherein said planar surface is sloped rearward at an angle of approximately 45 degrees relative to said central axis.

7. The lure of claim 5, wherein said central axis extends through said planar surface.

8. The lure of claim 5, wherein said rounded surface is a portion of a sphere.

9. The lure of claim 5, wherein said skirt plug is defined by an annular shoulder, such that the diameter of said skirt plug is smaller than the diameter of said body between said shoulder and said nose.

10. The lure of claim 9, wherein said body is approximately one and ¾ inches in length and approximately one inch in diameter, said skirt plug is approximately ¾ inches in length and approximately 13/16 inches in diameter, said planar surface extends approximately ⅛ inches beyond said central axis, and said partially circular junction is approximately ⅞ inches from said shoulder.

11. An artificial fishing lure comprising:

a generally cylindrical main body comprising a nose, a skirt plug, and a coaxial bore disposed about a longitudinal central axis;

a skirt comprising a collar attached to said skirt plug and a plurality of elongated, flexible streamer members;

wherein said nose consists essentially of a planar surface and a convex rounded surface, said planar surface intersects with said body at an oblique angle to said longitudinal central axis, said planar surface and said rounded surface intersect along a curved junction, and said rounded surface intersects said body along a partially circular junction which occupies a plane perpendicular to said longitudinal central axis, and wherein the outer boundary of said planar surface is defined by the intersection of said planar surface with said body and said rounded surface, and wherein no portion of said rounded surface extends radially beyond said partially circular junction in the direction perpendicular to said longitudinal central axis.

12. The lure of claim 11, wherein said central axis extends through said planar surface.

13. The lure of claim 12, wherein said planar surface is sloped rearward at an angle of approximately 45 degrees relative to said central axis.

14. The lure of claim 12, wherein said rounded surface is a portion of a sphere.

15. The lure of claim 14, wherein said skirt plug is defined by an annular shoulder, such that the diameter of said skirt plug is smaller than the diameter of said body between said shoulder and said nose.

* * * * *